Figure 1A:
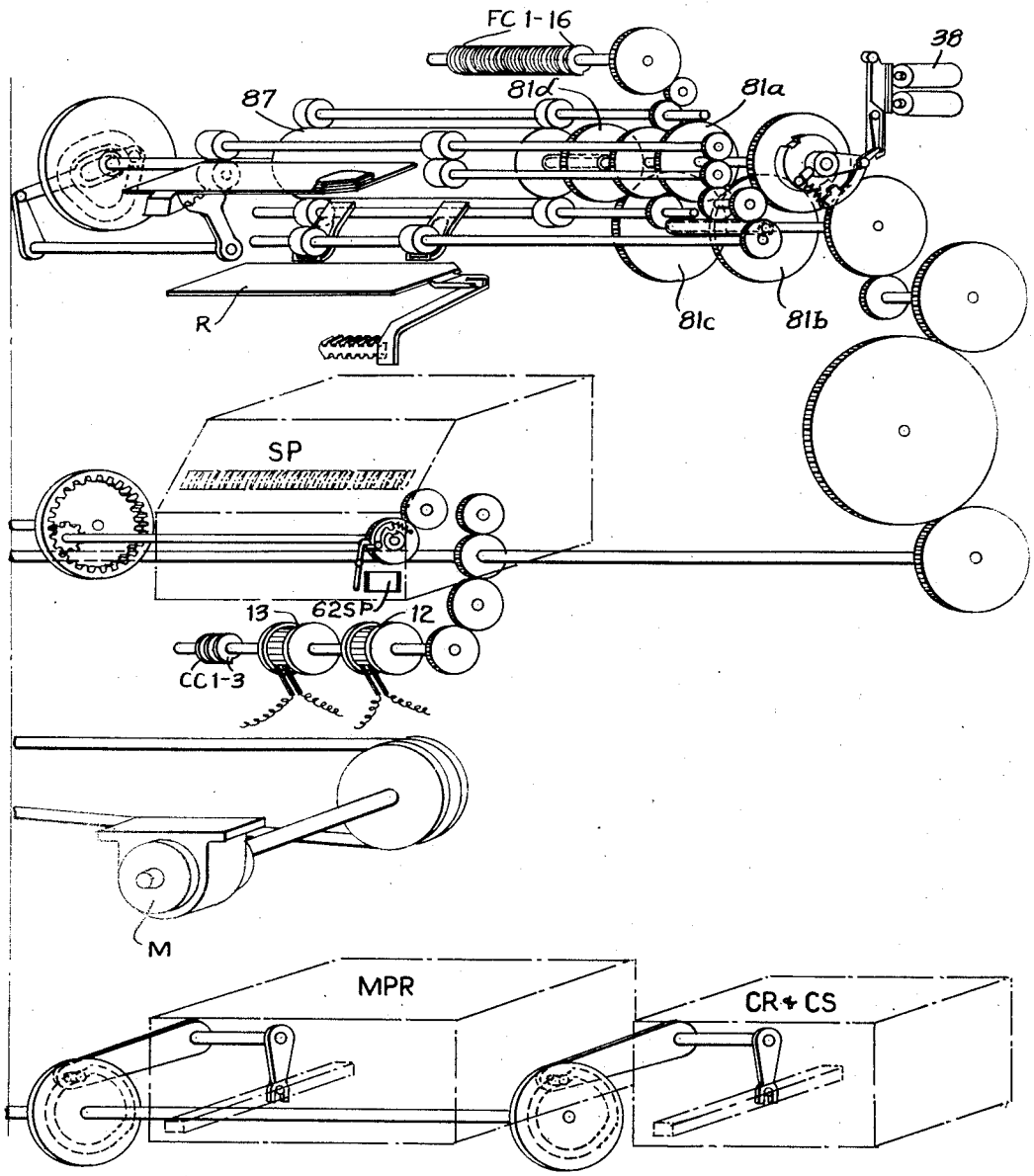

Dec. 27, 1938.   J. W. BRYCE   2,141,598
AUTOMATIC DECIMAL POINT SELECTING DEVICE FOR ACCOUNTING MACHINES
Filed May 4, 1934   9 Sheets-Sheet 1
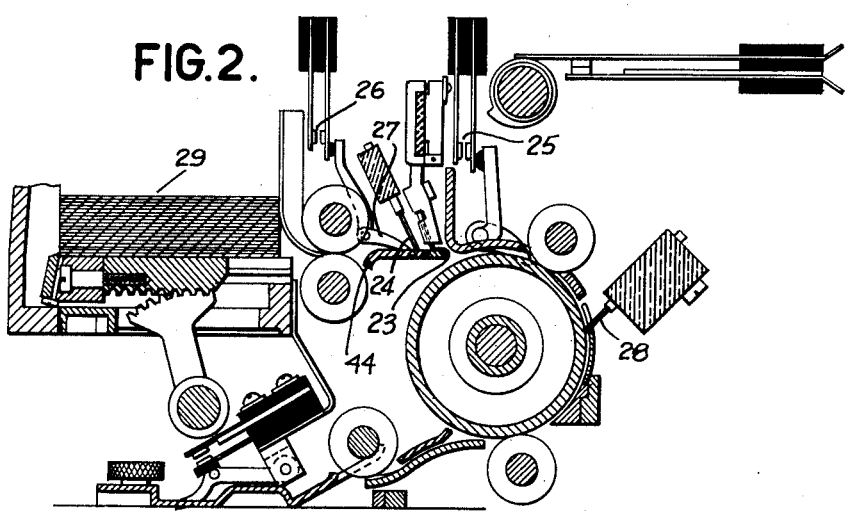
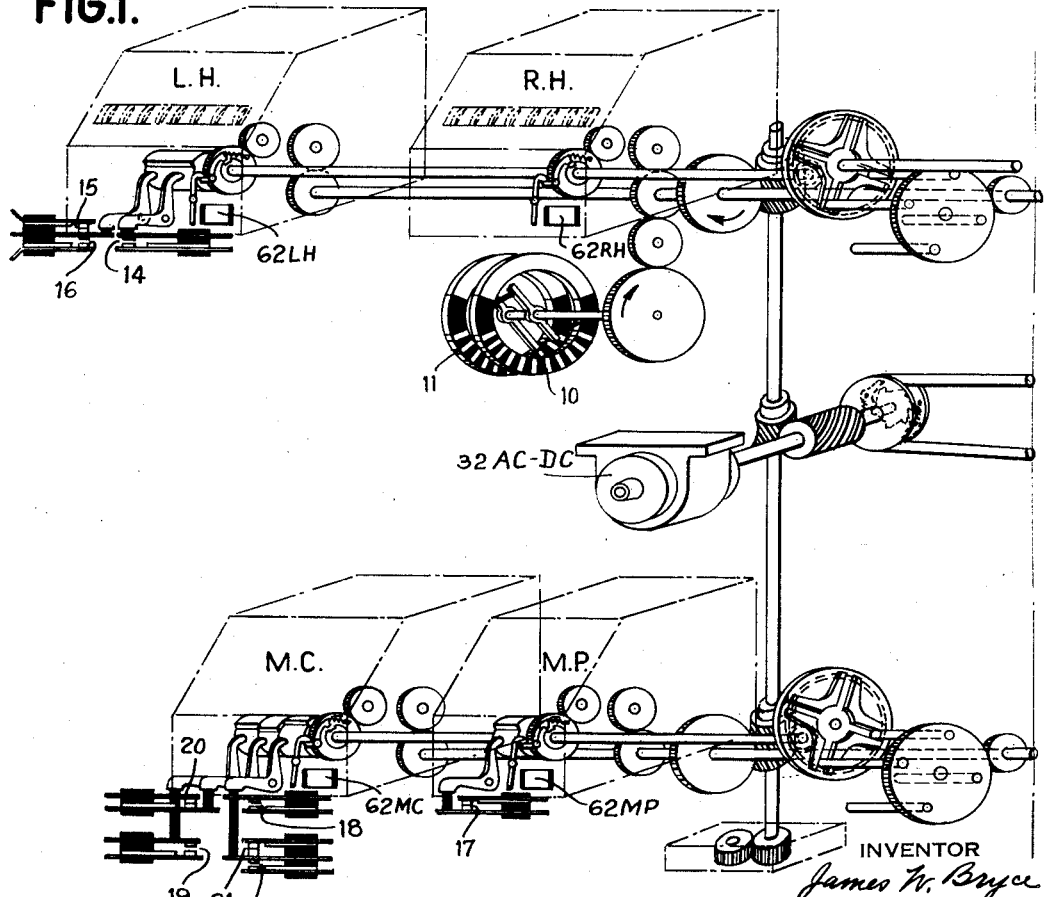
INVENTOR
James W. Bryce
BY
Cooper, Kerr & Dunham
ATTORNEYS Dec. 27, 1938.   J. W. BRYCE   2,141,598
AUTOMATIC DECIMAL POINT SELECTING DEVICE FOR ACCOUNTING MACHINES
Filed May 4, 1934   9 Sheets-Sheet 2

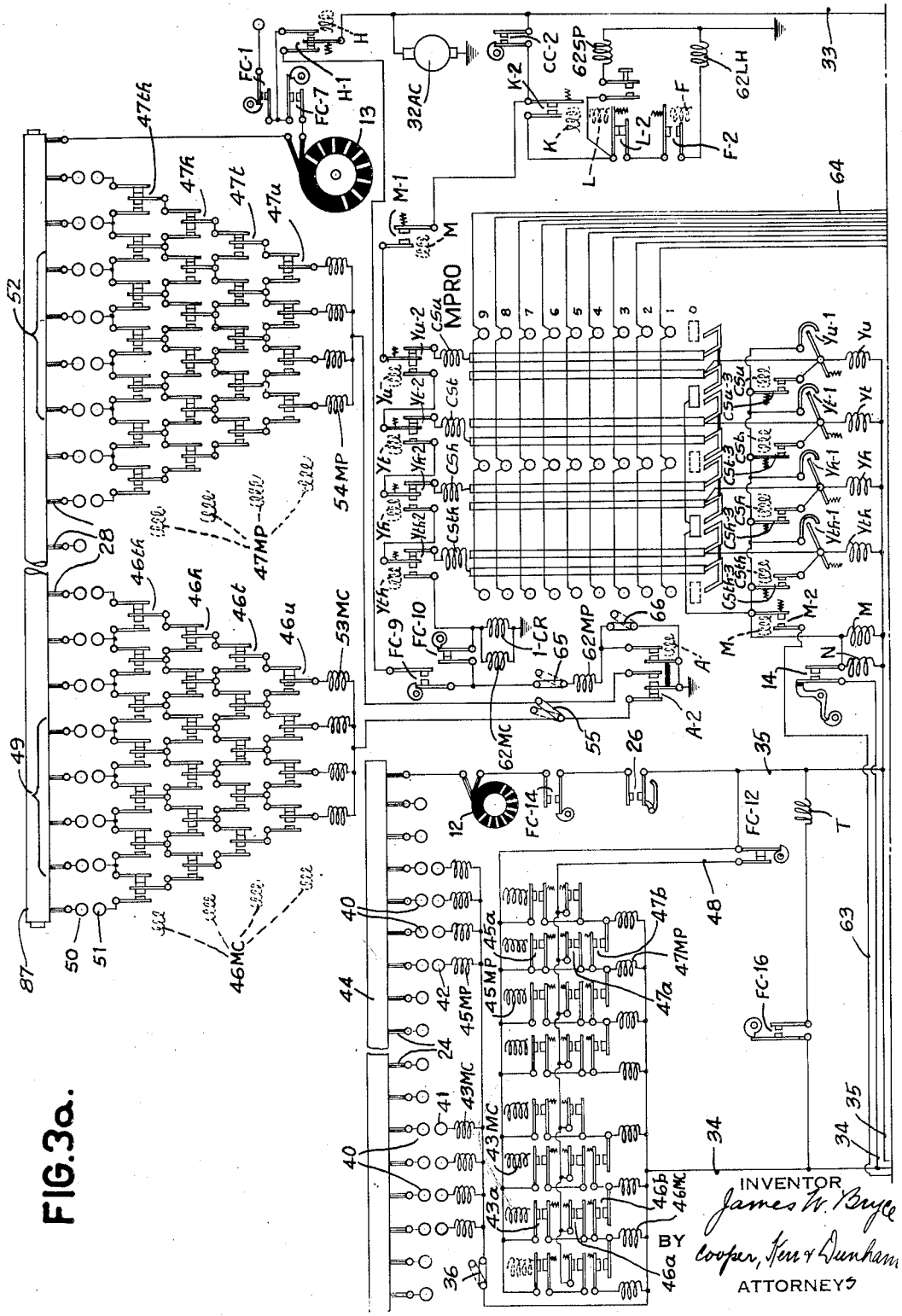

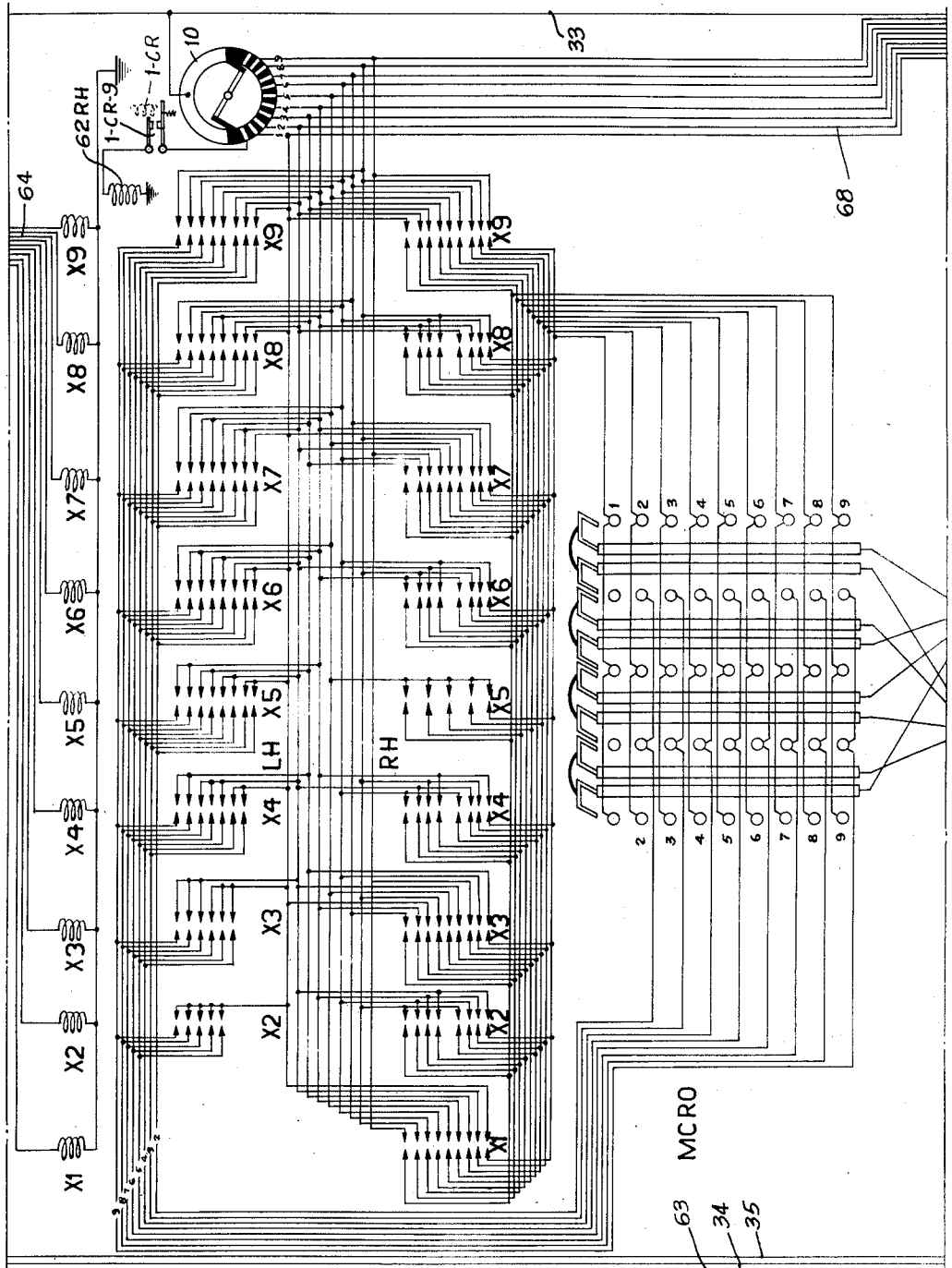

Dec. 27, 1938. J. W. BRYCE 2,141,598
AUTOMATIC DECIMAL POINT SELECTING DEVICE FOR ACCOUNTING MACHINES
Filed May 4, 1934 9 Sheets-Sheet 5

INVENTOR
James W. Bryce
BY
Cooper, Kerr & Dunham
ATTORNEYS

Dec. 27, 1938.  J. W. BRYCE  2,141,598
AUTOMATIC DECIMAL POINT SELECTING DEVICE FOR ACCOUNTING MACHINES
Filed May 4, 1934    9 Sheets-Sheet 6
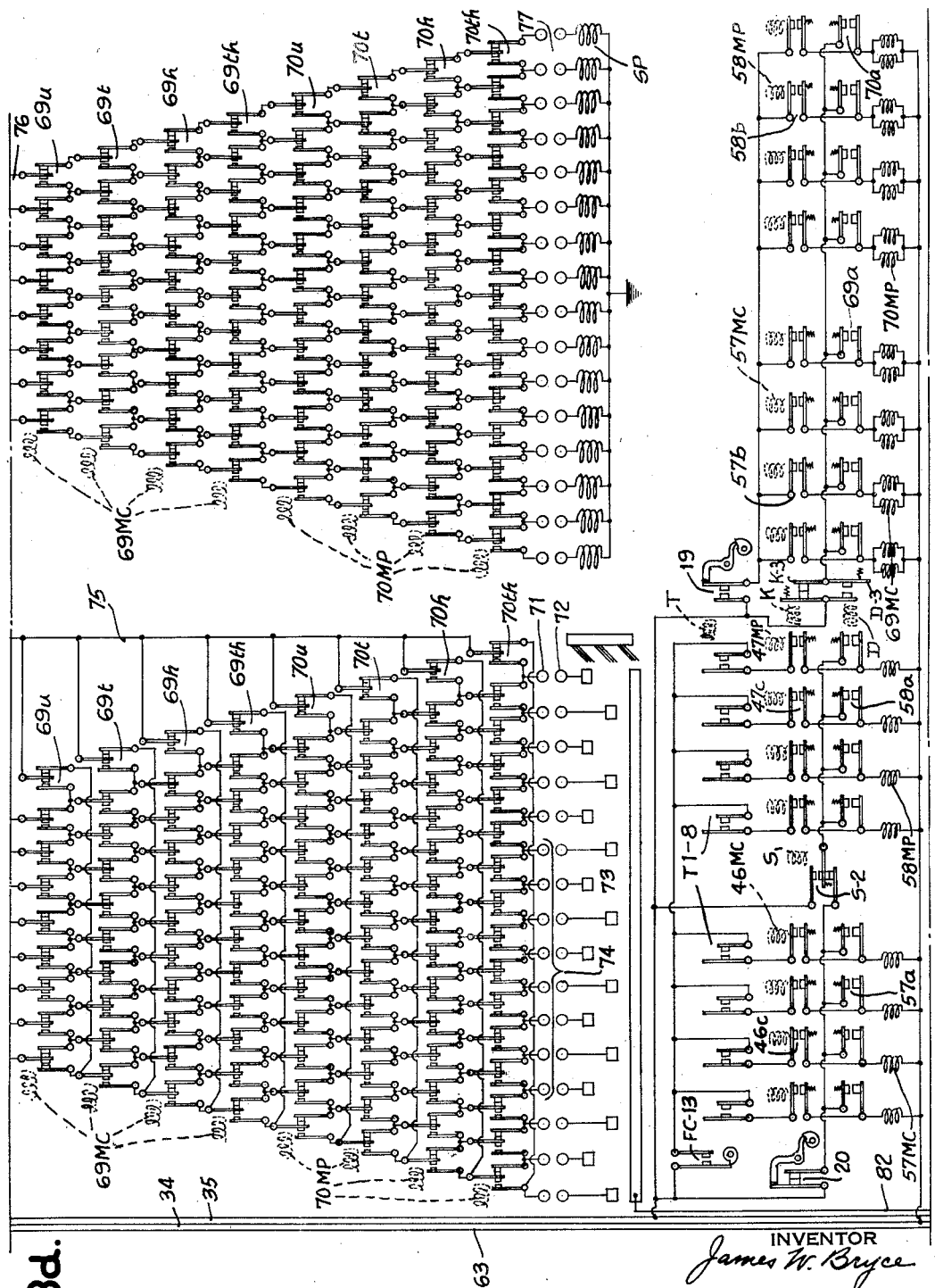

Dec. 27, 1938.  J. W. BRYCE  2,141,598
AUTOMATIC DECIMAL POINT SELECTING DEVICE FOR ACCOUNTING MACHINES
Filed May 4, 1934   9 Sheets-Sheet 7
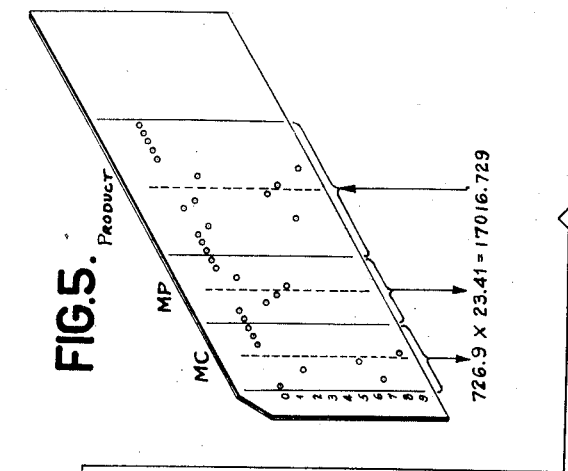
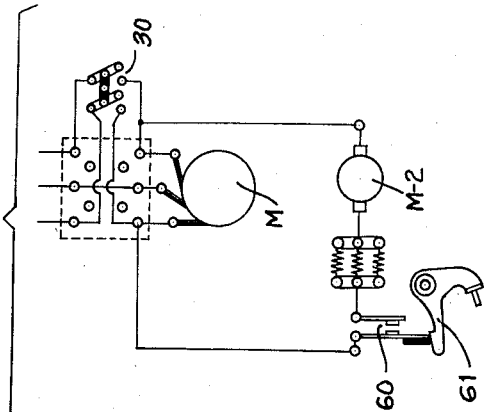
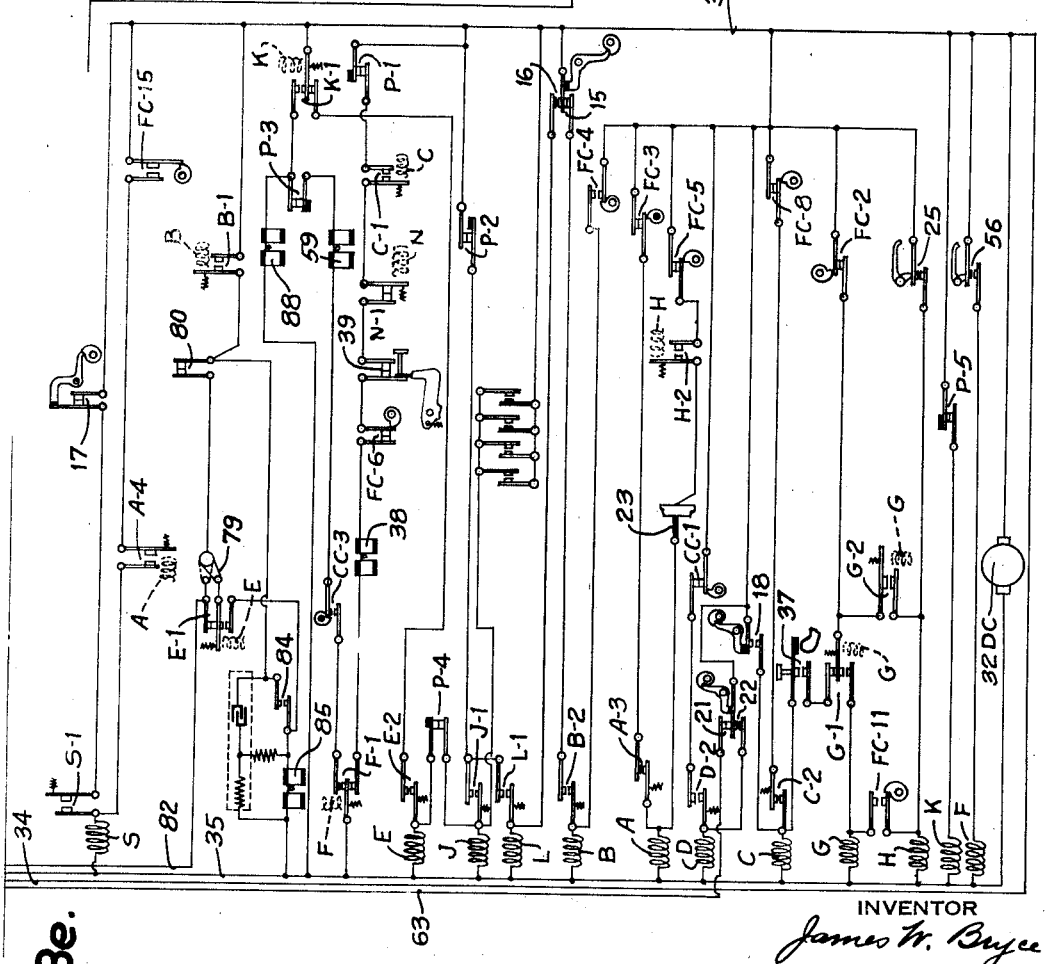
INVENTOR
James W. Bryce
BY
Cooper, Kerr & Dunham
ATTORNEYS Dec. 27, 1938.    J. W. BRYCE    2,141,598
AUTOMATIC DECIMAL POINT SELECTING DEVICE FOR ACCOUNTING MACHINES
Filed May 4, 1934    9 Sheets-Sheet 8

FIG.4.

INVENTOR
James W. Bryce
BY
Cooper, Kerr + Dunham
ATTORNEYS

Patented Dec. 27, 1938

2,141,598

UNITED STATES PATENT OFFICE 2,141,598

AUTOMATIC DECIMAL POINT SELECTING DEVICE FOR ACCOUNTING MACHINES

James W. Bryce, Bloomfield, N. J., assignor to International Business Machines Corporation, New York, N. Y., a corporation of New York Application May 4, 1934, Serial No. 723,888

11 Claims. (Cl. 235—61.10)

This invention relates to improvements in accounting machines and more particularly to improvements in automatic decimal point selecting devices for multiplying and other accounting machines.

In accounting operations, multiplying computations frequently involve decimals:—for example, a series of computations may comprise:

$$73.29 \times 742.0013$$
$$0.4729 \times 26.3718$$
$$3916.0189 \times 1403.116$$

In computing the foregoing, the actual act of multiplying involves only the various digits, taking into account their denominational position, and multiplication is effected in the same manner irrespective of the location of the decimal point. For example, 73.29×742.0013 would be computed in the same manner as the multiplication of 7329.0×74.20013. However, the position of the decimal point in the factors does determine and effect the location of the decimal point in the product. Furthermore, frequently the capacity of an accounting machine is limited to a determined number of columnar orders and frequently it is desirable to disregard and eliminate from the computations insignificant places which do not materially affect the result.

The present invention is directed to the provision of means whereby a multiplying machine may be capable of automatically selectively entering into the machine the factors of a multiplying computation according to a pre-limited and preselected number of columnar orders and at the same time take into account the decimal point in each factor or factors in effecting the selection and rejection and entry of such factor or factors.

To illustrate the foregoing, assume a machine to be capable of entering a multiplier and multiplicand each with four columnar orders only. According to the present invention the machine would automatically enter the previously set forth factor amounts as follows:

(1)       73.29 × 742.0
(2)         .4729× 26.37
(3)      3916. ×1403.

In computation (1) the component .0013 of the multiplier is disregarded. In computation (2) .0018 in the multiplier is disregarded and not entered and in computation (3) .0189 in the multiplicand and .116 in the multiplier is disregarded and not entered. All of the foregoing operations are effected automatically by the operation of the machine, i. e. the machine inspects the multiplicand and multiplier for the location of the decimal point in each factor and then effects the entry of the greatest possible number of columns (according to the capacity of the machine), taking into account the decimal positions so as to obtain the highest available orders in each of the factors which are actually entered.

A further object of the present invention resides in the provision of means whereby a machine of this class may automatically locate the decimal point in the product and carry out such automatic location in accordance with the relative positions of the decimal points in the entered factors.

A further object of the present invention resides in the provision of means for automatically locating the decimal point in the product as an incident to the reading out of the product from the product receiving means of the machine.

A further object of the present invention resides in the provision of means whereby in a record controlled machine amounts may be entered into the machine with a selective shift of the entry or entries to the right or left in the entry receiving device or devices according to the magnitude of the entered amount or amounts.

A further object of the present invention resides in the provision of means whereby so-called rate card operations may be provided for and wherein the one factor of a multiplying computation may be read from the rate card, its decimal point position taken into account and such entry retained for computation with a series of multiplicands in which there may be a shift of the decimal point in the successive multiplicands. With each computation the product will be computed according to the fixed decimal point obtained from the rate card and the shifting decimal point obtained from the detail multiplicand cards.

A further object of the present invention resides in the provision of improved means for controlling the transfer of products to a summary products register in such a manner that entries may be made into the summary products accumulator of a plurality of products taking into account a possible shifting of the decimal point of successive products entered into the products accumulator and entering such products with a maintained decimal point relation in such summary products accumulator.

Further and other objects of the present invention will be hereinafter set forth in the accompanying specification and claims and shown in the drawings which show by way of illustration, a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Figure 4A:
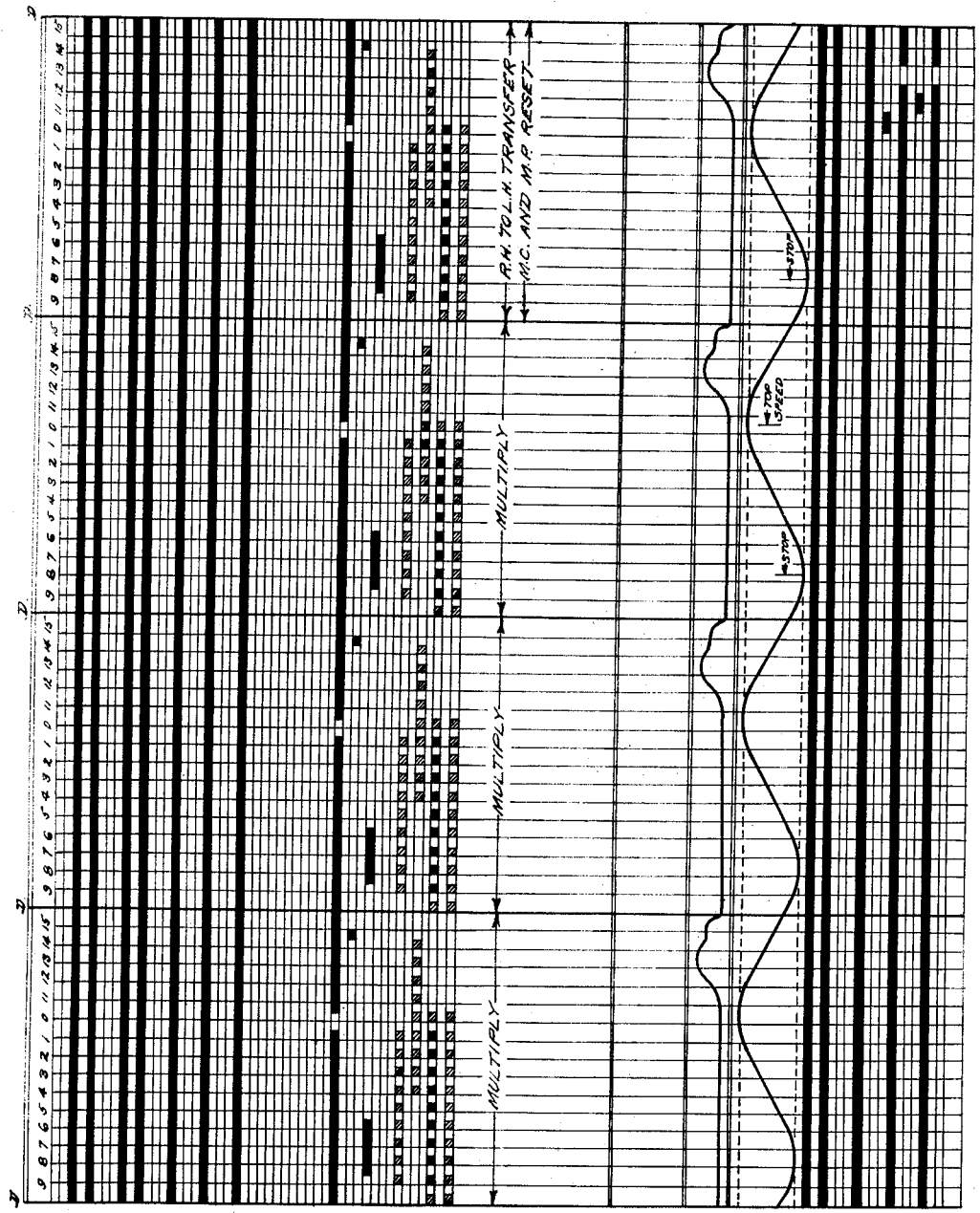

In the drawings:

Figures 1 and 1a taken together show somewhat diagrammatically the driving mechanism of the machine and the various sections thereof;

Fig. 2 is a cross-sectional view of the card feed, card handling and sensing section of the machine;

Figs. 3a, 3b, 3c, 3d and 3e, taken together and arranged vertically in the order named, show the circuit diagram of the machine;

Figs. 4 and 4a taken together and arranged side by side with Fig. 4a to the right of Fig. 4, show the timing diagram of the machine; and Fig. 5 is a diagrammatic view showing a typical computation involving decimal amounts.

The multiplying machine to which the present invention is shown applied, in general, is substantially the same as the machine shown and described in the United States patents to Daly 2,045,437 dated June 23, 1936, and Cunningham, No. 1,933,714, dated November 4, 1933, to which reference may be had for a full description of the general operation and arrangement of parts and the drive therefor. There are certain differences in the specific arrangement from that shown in the Cunningham patent which will be briefly alluded to.

In lieu of providing a direct drive for the contact roll 87 a creeping drive is provided which is also of a form well known in the art and shown and described in United States patent to George F. Daly, No. 2,045,437, dated June 23, 1936. This creeping drive includes supplemental gearing 81a, 81b, 81c, 81d for driving the contact roll 87 with a creeping motion (see Fig. 1a). The machine includes an LH accumulator, an RH accumulator, the MC and the MP accumulators shown on Fig. 1 and a summary products accumulator SP which is shown on Fig. 1a. These various accumulators are driven in the same manner as similar accumulators generally correspondingly located and driven as in the Cunningham patent above referred to and there is a reset drive which is generally similar to the reset devices of the Cunningham patent. There is also a multiplying relay section MPR and a column shift and control relay section (see CS and CR, Fig. 1a). The machine includes two impulse emitters 10 and 11 (Fig. 1) in lieu of the three emitters of the Cunningham patent.

In the present machine there are sixteen FC cam contacts, the same being designated FC—1 to 16 on Fig. 1a. The machine also comprises cam contacts CC—1 to 3 (Fig. 1a) which are driven from the counter drive shaft in the manner indicated. Two impulse distributors 12 and 13 are also provided. These distributors may be constructed in the manner shown in Cunningham Patent No. 1,757,112. The LH accumulator resetting devices control two sets of contacts, one designated 14 and comprising a pair of contacts which close upon reset and the other being a three-blade contact arrangement involving two pairs of contacts 15 and 16. Contacts 15 open upon reset and 16 close upon reset. The MP accumulator reset includes a single pair of contacts 17 which open upon reset. The MC accumulator reset device has associated with it two pairs of contacts 18 and 19 which close upon reset and a pair of contacts 20 which open upon reset. There is also a three-blade contact arrangement comprising contact pairs 21 and 22 with 21 opening upon reset and 22 closing upon reset.

Referring now to Fig. 2, in general the card handling and sensing section is the same as in the Cunningham Patent No. 1,933,714. In addition to the X brush which is designated 106 in the Cunningham patent and here designated 23, there is a row of supplemental or advance sensing brushes designated 24. The contact blocks for the X brush 23 and the advance sensing brushes 24 are insulated from one another as shown. In addition to the card lever operated contacts 25 there are supplemental card lever operated contacts 26 operated by a card lever 27 and so arranged to close when a card is under the advance sensing brushes 24. The readout brushes are shown at 28.

Complete details of the punch are not herein shown as they are substantially the same as the punch shown and described in the Daly patent in Figs. 5 and 5a thereof. There is, however, shown a card R in the entering section of the punch and a fragment of the punch mechanism is also shown.

Before describing the circuit diagram of the machine the general mode of operation will be briefly explained. It will be assumed that the present machine is intended to handle entries of a multiplier and a multiplicand having a maximum of four columns each. Upon a card entering the sensing section of the machine the advance sensing brushes 24 pre-sense the advancing card to determine the relative location of the highest order perforation in the multiplier and multiplicand fields of the card. Each card, furthermore, has the perforations thereon so disposed that the decimal points of successive cards occupy the same relative position. Thus the cards would be perforated with the perforations located thereon in the following manner:

$$726.9 \times 23.41$$
$$73.29 \times 742.0013$$
$$.4729 \times 26.3718$$
$$3916.0189 \times 1403.116$$

Referring to the first pair of factors set forth above (and which correspond to Fig. 5) the advance sensing brushes 24 pre-sense the multiplicand field of the card and determine that the highest order significant whole number figure of the multiplicand is in the hundreds order column (i. e. 7 is in the hundreds order). If zeros appear to the left or to the right, these will be disregarded, the machine pre-sensing the highest order significant whole number digit. There is the same pre-sensing of the multiplier field for the first card, the machine in this case pre-sensing that the highest order whole number significant digit of 2 is in the tens order. Otherwise expressed, means is provided to determine the denominational magnitude of amounts with respect to the decimal point in such amounts.

It may be explained that in perforating the cards the perforations are disposed on the cards with a relatively fixed decimal point, that is, the multiplicand field of the card is divided into two fields each of four columns and decimal amounts are always perforated in the right hand columns, the decimal point being considered as the division line between the columns as indicated by the dotted line in Fig. 5. The multiplier field is similarly divided with four columns to the left of the decimal point and four to the right and in perforating the perforations are located on the cards so as to have the decimal point come at the dividing line between the two fields. The pre-sensing brushes preferably control the entry of, for example, the multiplicand amount 726.9 into the MC receiving device of the machine in such a manner that 7 is entered into the highest order of this accumulator. Furthermore, a control is set up indicating the position of the decimal point and with the illustrative computation such decimal point is between the units order of the accumulator and the tens order. Briefly, the setup is such to indicate that 7 is in the hundreds order and accordingly, the decimal point will be between the third and fourth columns of this multiplicand amount. There is a similar pre-sensing control for the multiplier field. In this case, for the card shown in Fig. 5, the highest order significant digit is in the tens order and therefore the decimal point is between the second and third orders of the amount entered into the MP accumulator. If computations involved a greater number of columnar orders in the card than are available in one or both of the entry receiving devices, excess columns will be eliminated, four columns being the maximum number of columns entered into each entry receiving device according to the illustrated embodiment. It will be obvious that the invention is not limited to any particular number of columns. For example, with the factor amount read as 742.0013, the machine would enter the amount into the MP accumulator as 742.0. The multiplying computation is then effected in the customary manner and in recording back the product on the card the machine will take into account the relative positions of the decimal points in each of the two factors entering into the computation and so control the readout that the decimal point will be in a maintained position on the record card as shown on Fig. 5. Thus, in reading out, the machine ascertains that there are two decimal places in one factor, one in the other, giving a total of three decimal places, then controls the placing of the product on the record (see Fig. 5) so that three decimal places are to the right of the decimal column and the balance of five columns of the product are to the left of this imaginary decimal point line.

*Operation and description of the circuit diagram*

It will be assumed that properly perforated cards are in the supply magazine 29 of the card handling section of the machine (Fig. 2). To start the machine in operation the switch 30 (Fig. 3e) is closed first to supply current for the main driving motor M, and for the punch driving motor M—2. Rotation of the main driving motor M puts in operation the A.-D. C. generator 32 (Figs. 3a and 3e). The A. C. end of the generator supplies current to bus 33 and to ground (Fig. 3a) and the D. C. end of the generator supplies current to buses 34 and 35 (Fig. 3e). Before closing the start key, the operator throws switch 36 to the closed full line position as shown in Fig. 3a. This switch is used when decimal point controlling operations are to be effected. The start key is now depressed to close start key contacts 37 (Fig. 3e) and to complete a circuit from the 35 side of the D. C. line through relay coil C, relay contacts G—1 now closed, cam contacts FC—2 to the 34 side of the D. C. line. A stick circuit is established through the relay contacts C—2 of relay coil C and cam contacts FC—8 now closed. Energization of relay coil C also closes relay contacts C—1 establishing a circuit from the 35 side of the D. C. line through relay contacts F—1, through card feed clutch magnet 38 (see also Fig. 1a), through cam contacts FC—6 now closed, through stop key contacts 39 now closed, through relay contacts N—1 now closed, through relay contacts C—1 now closed, through the punch control contacts P—1 now closed and back to line 34. As in previous machines, the start key must be kept depressed for the first four counter cycles in starting up a run or alternatively it may be depressed and released and again depressed. Starting operations are prevented until the feed rack of the punch is in proper right hand position. This is provided for by contacts P—1.

The first complete card feed cycle on starting up the machine will advance the first card to a point where the X (first extra index point position of the card) brush will be in alignment with the special X brush 23, in which position the 9 index point position of the card will be about ready to pass under brushes 28. In reaching this position the card passes under the row of advance sensing brushes 24 (Fig. 2). Such brushes 24 are also shown in Fig. 3a. The row of brushes 24 are electrically connected to individual plug sockets 40 (Fig. 3a). Other sockets 41 and 42 are provided on this plug board to which suitable plug connections may be made. Sockets 41 are for the multiplicand and sockets 42 are for the multiplier. Wired to sockets 41 and 42 are a number of significant figure selecting coils designated 43MC and 45MP. As a card passes under the advanced card lever 27 (Fig. 2), the advanced card lever contacts 26 are closed (see Fig. 3a) and a circuit is completed from line 35 through contacts 26, through cam contacts FC—14 now closed to the impulse distributor 12 which supplies current to the contact bus 44 of the advance sensing brushes. The return circuit from the coils 43MC and 45MP is through switch 36 to the 34 side of the line. It may be explained that the 43MC coils are so plugged up by the plug connections between 41 and 40 that the multiplicand field of the record card is sensed which is to the left of the decimal position. The same applies to the 45MP coils with respect to the multiplier field. If the card shown in Fig. 5 was passing the advance sensing brushes upon the passage of the 7 perforation past the brushes, there would be an energization of the hundreds order 43MC coil. Similarly, for the multiplier field and for the same card the 2 perforation in the tens order would energize the tens order coil 45MP. It will be understood that these coils are energized with a momentary impulse on account of the transit of the card past the brushes. The coils 43MC and 45MP are in effect pickup coils which, upon transitory energization cause other coils to be energized, the energization of which is maintained.

It will be assumed that the hundreds order 43MC coil is temporarily energized. Such temporary energization will close contacts 43a and complete a circuit to energize the hundreds order coil of the 46MC group which is the holding coil for the 46h set of contacts. The energization of 46MC will in turn close stick contacts 46a and will also close transfer contacts 46b. The closure of 46b will in turn effect energization of the 46MC coils to the right. It will be understood that each 46MC coil, with the exception of the right coil, has a pair of transfer contacts 46b which brings about the energization of the next 46MC coil to the right. There is a similar arrangement in the multiplier section, there being 47MP coils in this section which are similarly energized. The holding circuit for the 46MC and 46MP coils which have been energized extend through cam contacts FC—12 and via a line designated 48 which is connected to the contacts 46a and 47a as shown. The coils 46MC and 47MC when energized are also adapted to shift circuit shifting contacts which are arranged and wired together in what might be termed an "inverted pyramidical" arrangement as shown at the top of Fig. 3a. With the units, tens and hundreds 46MC coils energized, the circuit shifting contacts 46u, 46t and 46h will be shifted to the left. With such contacts shifted the reading derived from the card will be from the zone indicated by the bracket designated 49 in Fig. 3a. If all coils of the 46MC group were energized, the reading would be of four columns but displaced one column relatively to the left with respect to the bracket 49. Similarly, if only the 46u and 46t contacts were shifted, the reading would be of four columns displaced one column to the right and so on. The brushes 28 extend to the usual plug sockets 50 to which plug connections are made to sockets 51. An exactly similar contact and plug board arrangement is provided for the multiplier section and this need not be repeated.

In the multiplier section it may be stated that the multiplier is read from the bracketed section 52, this being brought about by the shifting of contacts 47u and 47t under the control of their corresponding 47MP coils. The shifting contacts above described, it will be understood, are wired to the 53MC and 54MP counter magnets.

At the beginning of the second card feed cycle the card traverses the brushes 28 and the multiplier and multiplicand are read from the card and are entered into the MP and MC receiving devices. At the end of the first card feeding cycle the card lever contacts 25 will be closed, causing energization of the relay coil H (Fig. 3e) whereupon relay contacts H—1 (Fig. 3a) shift from the position shown to reverse position. As the second card feed cycle ensues, the card is carried past the brushes 28 and the multiplier and multiplicand amounts are entered into their respective receiving devices.

The entry circuits will now be traced. Current flows from the A. C. line 33 (Fig. 3a), through relay contacts H—1, now shifted, through cam contacts FC—7, through the impulse distributor 13 to the card transfer and contact roll 87, thence through the brushes 28 pertaining to the multiplier, through plug connections at the plug board, through the pyramidical circuit shifting contacts to the 54MP counter magnets. Similarly the selected 53MC counter magnets are energized. The ground return circuit from the 53MC contacts is through relay contacts A—2 in the position shown and the return circuit for the 54MP counter magnets is through these same relay contacts A—2, switch 55 being thrown to the full line position as shown. After the machine has been started up the hand initiating control circuits are cut out. This is effected in the following manner. At the beginning of the second card feed cycle the closure of cam contacts FC—11 will cause relay coil G (Fig. 3e) to become energized. Current flows from line 35, through relay coil G, through cam contacts FC—11, through the card lever contacts 25 now closed and back to the other side of the line. The energization of relay coil G will shift the three-blade relay contacts G—1 to reverse position interrupting the circuit to the start key contacts 37 but maintaining the circuit to cam contacts FC—2. Energization of relay coil G will also close relay contacts G—2 and establish a stick circuit for relay coils G and H either through the FC—2 cam contacts or the card lever contacts 25. The card is fed on through the card handling section of the machine and ultimately it passes to the R position in the punch, closing card lever contacts 56 and energizing relay coil F, causing relay contacts F—1 to shift to reverse position (see Fig. 3e).

Brushes 28 sense a card on one counter cycle and brushes 24 in this same counter cycle do not sense the following card, but on the contrary sense the following card one counter cycle later. Expressed otherwise, inasmuch as a card feed cycle employs two counter cycles, brushes 28 sense one card on the first counter cycle of the card feed cycle, and brushes 24 sense the following card on the second counter cycle of the same card feed cycle.

By the foregoing operation the multiplicand and multiplier will have been selectively entered into the receiving devices in such a manner that the relatively higher orders only of the factors are entered, that is with the present embodiment where there are four possible columns the four highest orders are entered from the multiplicand and multiplier fields. Due to the fact that there is an overlapping of cycles in the machine, provision must be made for retaining a setup corresponding to that of the 46MC and 47MP coils for subsequent reading out operations from the products receiving device. While the actual reading out operation occurs subsequently, this setup will now be described.

In short, what is provided is an intermediate setup between the entry setup and the readout setup. This intermediate setup is obtained in the following manner. Just before the regular brushes 28 have completed their reading of the factors from the card, cam contacts FC—16 (Fig. 3a) close to cause the energization of relay coil T. The energization of relay coil T (see Fig. 3d) closes its related contacts T—1 to T—8 inclusive. It may be explained that coils 46MC and 46MP also control contacts 46c and 47c (see Fig. 3d). Accordingly, with the example previously given, the 46c contacts pertaining to the units, tens and hundreds orders will be closed and 47c contacts pertaining to the units and tens orders will be closed. Inasmuch as these 46c and 47c relay contacts are closed and, since the relay contacts T—1 to 8 close under the control of relay coil T, circuits will be completed to the corresponding and related intermediate relay holding coils 57MC and 58MP upon closure of cam contacts FC—13. The energization of relay coils 57MC and 58MP is maintained through stick contacts 57a and 58a. The return circuit for stick contacts 57a is through the multiplicand reset contacts 20 and the return circuit for stick contacts 58a is through relay contacts S—2 and reset contacts 20 or alternatively in a path by-passing reset contacts 20 in the event that the S relay coil is energized to shift relay contacts S—2 to reverse position. It may be explained that relay coil S is energized on rate card operations, but for reading both factors from each detail card this relay remains de-energized. After selected coils of the 57MC and 58MP set have been energized and their stick circuits established cam contacts FC—12 open up to interrupt the stick circuit for the 46MC and 47MP relay coils (Fig. 3a).

In starting up the machine the punch parts are in such position that contacts P—1, P—2, P—3, P—4 and P—5 are closed. With contacts P—5 closed relay coil K will be energized, shifting relay contacts K—1 to reverse position. Upon the shifting of relay contacts F—1 (Fig. 3e) as previously explained and upon the closure of cam contacts CC—3 a circuit will be established to the punch clutch magnet 59. This circuit is completed to the other side of the line, through the punch contacts P—3 now closed and relay contacts K—1 which are in shifted position. The energization of the punch clutch magnet 59 will cause closure of contacts 60 (Fig. 3e) which become latched closed by a latch 61. Accordingly, current supply is provided for the punch driving motor M—2. The card which has been previously read and which is in the punching unit in the R position is now advanced endwise through the punching unit in the manner described in the Cunningham Patent No. 1,933,714, to a position in which punching is to commence.

Multiplying and set up of the cycle controller is initiated by the reset of the LH accumulator. The energization of relay coils F and K in the manner previously described closes relay contacts F—2 and K—2 (Fig. 3a). Upon the closure of cam contacts CC—2, current flows from the 33 A. C. line, through CC—2, through relay contacts K—2, through normally closed relay contacts L—2, through relay contacts F—2, through the 62LH reset magnet and back to ground. Energization of 62LH initiates the resetting of the LH accumulator in the customary manner.

During the LH reset contacts 16 (Fig. 3e) close and a circuit is completed to relay coil L opening relay contacts L—2 and preventing repetition of the LH reset. Relay coil L is only temporarily energized but a stick circuit is established for this coil through relay contacts L—1, the stick circuit extending to the other side of the line through punch contacts P—2 normally closed. Contacts P—2 remain closed until the punch rack of the punch has completed its traverse to the left and are thereupon reopened. At this time relay coil L will become deenergized, allowing relay contacts L—2 (Fig. 3a) to close, but a new LH reset cannot be initiated until there is a reclosure of relay contacts K—2 and F—2 upon a subsequent energization of relay coils K and F.

The machine is now ready to set up the cycle controller and effect multiplying. Upon LH reset a circuit is established from the 34 side of the D. C. line, through the LH reset contacts 14, through coils M and N and back to line 35 (see Fig. 3a). The energization of relay coil M will close relay contacts M—1 and M—2. Relay contacts M—2 establish a stick circuit via wire 63 and the multiplicand reset contacts 21 (see Fig. 3e) back to the other side of the line 34.

*Column skip and cycle controller*

The cycle controller and column skipping arrangement is substantially the same as that shown in Fig. 15a of the Cunningham Patent No. 1,933,714 and it is set up from the MPRO readout in the same manner as in the Cunningham patent. With the cycle controller set up upon the energization of relay coil M, contacts M—1 close and following the set up of the cycle controller, cam contacts CC—2 (Fig. 3a) close. Current then flows from line 33, through cam contacts CC—2, relay contacts M—1, through the Yu—2 set of transfer contacts which are in the position shown, down through the CSu relay magnet and out through the brush which is standing, say on the 1 spot of the readout in the units order down through the 1 line of the group of wires 64 to the X—1 multiplying relay magnet (see Fig. 3b) and to ground. Energization of the X—1 relay magnet brings about the multiplying operation and the energization of the CSu relay magnet directs the entry into the proper columnar orders of the RH and LH registers.

The manner of effecting multiplication need not be traced in detail since it is substantially the same as that in the aforementioned Cunningham patent. Upon completion of multiplying all of the Y—2 set of transfer contacts (Fig. 3a) will have been shifted to reverse position from that shown and upon closure of cam contacts CC—2 there is a circuit path from the 33 side of the A. C. line through cam contacts CC—2, through relay contacts M—1 now closed, through all of the Y—2 set of transfer contacts to the 1—CR relay magnet and to the 62MC reset magnet. A branch circuit also extends through cam contacts FC—10, through switch 65, through the 62MP reset magnet, through switch 66 and back to ground. Energization of 62MP and 62MC causes reset of the MP and MC accumulators. The switches 65 and 66 are thrown to the full line position as shown for normal multiplying operations.

Figure 3C:
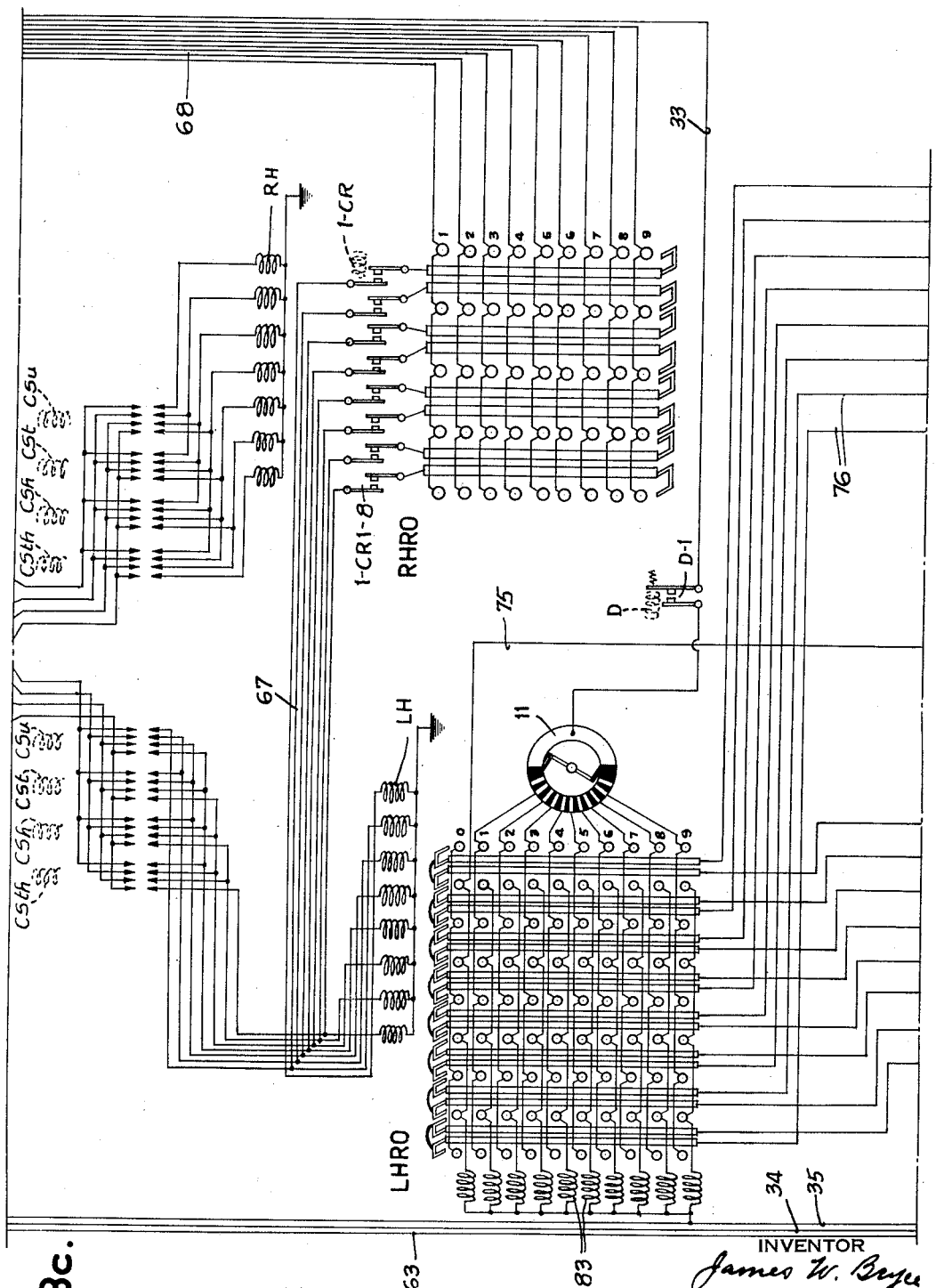

After the multiplying computation is complete for a given problem, the amount standing in the RH accumulator is transferred over to the LH accumulator. This operation is brought about upon the energization of relay coil 1—CR in the manner previously explained. The energization of this relay permits closure of contacts 1—CR—1 to 8 (Fig. 3c) and 1—CR—9 (Fig. 3b). Closure of 1—CR—1 to 8 connects the RHRO readout with the 67 transfer lines so that upon the operation of emitter 10, impulses are emitted through a group of lines 68 (Figs. 3b and 3c) to and through the RHRO readout, through the 1—CR—1 to 8 contacts to the LH accumulator magnets. The amount standing on the RH accumulator is accordingly entered into the LH accumulator in the proper columnar relation therein. At the completion of emission of impulses by emitter 10, the emitter brush on encountering the extra spot, supplies current through contacts 1—CR—9 (Fig. 3b) now closed, to RH reset magnet 62RH to cause the reset of the RH accumulator. It may be explained that the reset of the MP and MC counters occurs concurrently with RH to LH transfer and the reset of the MC counter will cause the opening of contacts 21 (Fig. 3e) to break the stick circuit for relay coils M and N and for all the Y magnets, thus preparing the cycle controller for a new setup from the following card.

Before explaining how a new card feed is reinitiated, certain operations which occur upon reset of the multiplicand accumulator will be here explained.

It has been previously explained that intermediate selecting relays 57MC and 58MP (Fig. 3d) have been energized and held energized in a selective manner. The setup of these relays is, during the MC reset, transferred over to other controlling relays. Each of the 57MC coils and each of the 58MP coils has respectively associated with it a contact 57b or 58b respectively, which becomes closed upon the energization of its related coil. The coils are shown in dotted lines in Fig. 3d in proximity to their related contacts. Upon closure of the multiplicand reset contacts 19, selected coils of the 69MC set and of the 70MP set will become energized. Upon energization of these coils their corresponding stick contacts 69a and 70a will become closed to maintain the energization of the said coils after reset contacts 19 reopen. The stick circuit extends through normally closed contacts K—3. After a setup of selected coils 69MC and 70MP is obtained in accordance with the selective energization of 57MC and 58MP the MC reset contacts 20 reopen to break the stick circuit for 57MC and 58MP and allow them to become de-energized.

It will be noted that on Fig. 3d, the coils 69MC and 70MP are each shown as double coils. The contacts controlled by these coils are utilized for controlling the readout from the products receiving device to the record and they are also utilized for controlling the readout from the LH products accumulator to the summary products accumulator. One set of coils controls the readout to the card and another set of coils controls the readout to the summary products accumulator. The coils furthermore control the readout in accordance with the decimal place of the previously made computation in such a manner that the recorded product will always be placed on the card with the decimal place in the same position and so that the accumulation of products will be entered into the summary products register with the decimal point in the same position for successive computations. The readout to the card will first be described.

Each of one set of the coils 69MC and 70MP has associated with it a set of switching contacts. These on Fig. 3d are shown as 69u, 69t, 69h, 69th, 70u, 70t, 70h and 70th. One set of the 70th contacts are wired to plug sockets 71, other plug sockets being provided at 72 wired to the readout strip generally designated 73 and corresponding to the readout devices generally designated 612, 613, 614 in the Cunningham patent above referred to. The contacts 69u, etc. and 70u, etc. are arranged in pyramidical arrangement and are selectively shifted under the control of magnets 69MC and 69MP. Such contacts selectively shift the readout relation intermediate the LHRO readout and the contact strip 73.

It will be understood that suitable plugs connect 71 and 72. It will be recalled that the magnets 69MC and 70MP are energized in such a manner that they have a relation to the decimal point of the computation. With the illustrative problem shown in Fig. 5, the readout relation will be such that recording upon the record card will be made in the bracketed zone 74 indicated on Fig. 3d. If another problem was being computed involving a different location of the decimal point the bracketed zone 74 would be shifted either to the left or to the right depending upon the position of the decimal point for the particular computation which was effected. If the resulting product was all decimals the bracket 74 would be to the extreme right and if it were all whole numbers it would be to the extreme left. It will be further understood that zeros are punched in the card in those columns of the card field not occupied by the product, this being required to carry out successive punching in a punching mechanism of this class. It will be understood that the LHRO readout by itself will control the punching of zeros within the actual product but will not take care of the punching of zeros in columns of the record which are not connected to the readout. The zero punching circuit for these extra columns is provided through a wire 75 which leads to the zero bus of the LHRO readout and which also connects to the center blade of certain ones of the sets of contacts 69u, etc. and 70u, etc. The other contacts which are wired to these zero controlling contacts provided for the proper entry of zeros in the columns which do not actually receive the product.

The reset of the MC counter effects closure of reset contacts 18 (Fig. 3e) which causes energization of relay coil C and the closure of reset contacts 22 energizes relay coil D. When relay coil C is energized relay contacts C—1 close and there is a re-initiated energization of the card feed clutch magnet 38 through a circuit which has been previously traced.

Before or upon punching of the product amount back upon the record card there is a transfer over of the product from the LH accumulator into the summary products accumulator. This is brought about in the following manner. Energization of relay coil D (Fig. 3e) causes closure of relay contacts D—2 establishing a stick circuit for relay coil D through cam contacts CC—1. Energization of relay coil D also closes relay contacts D—1 (Fig. 3c) and provides current supply to emitter 11 from the 33 A. C. line. Energization of relay coil D also closes contacts D—3. The relay contacts D—3 are provided as a supplementary control to provide for maintaining 69MC and 70MP coils energized when summary products are to be accumulated, but when punching is to be suppressed. Emitter 11 emits impulses through one section of the LHRO readout through lines 76 which extend through the various shiftable contacts 69u, etc., 70u, etc., to the plug board 77 and through the plug connections at this plug board to the SP counter magnets. The contacts 69u, etc., and 70u, etc., direct the entry of each product into the SP accumulator in accordance with the relative location of the decimal point in the product.

The machine is now ready to punch back the product on the record card which operation is initiated in the following manner. Early in the re-initiation of the card feed cycle cam contacts FC—4 (Fig. 3e) close, energizing relay coil B, closing stick relay contacts B—2 and providing a stick circuit for relay coil B through the LH reset contacts 15 now closed. The energization of relay coil B also closes relay contacts B—1. Assuming switch 79 in the full line position as shown, current will flow from line 34, through relay contacts B—1 now closed, through punch escapement contacts 80, through the switch 79, through relay contacts E—1 now in the position shown, via a line 82 to the readout strip 73 (Fig. 3d). With current thus supplied to the readout strip and with the brush of the readout standing on the first of the spots at which punching is to commence the punching operation will start, there being a readout through a related section of the LHRO readout and an energization of punch selector magnets 83. The closure of relay contacts B—1 (Fig. 3e) also supplies current to contacts 84 in the punch which contacts are closed by interposer action to supply current to the punch operating magnet 85. Punching now proceeds and will continue until the complete product is read out and punched. When the punching operation is completed contacts P—5 will be closed energizing relay coil K, shifting relay contacts K—I to establish a circuit to the eject magnet 88. The punched card will then be ejected from the punch. A new multiplying operation will then be initiated upon the succeeding record card. Such succeeding operation is initiated by the closure of relay contacts K—2 and F—2 (Fig. 3a) and by the reset of the LH accumulator as herein before described. Upon such re-initiation of a new multiplying operation the energization of relay coil K (Fig. 3e) will open contacts K—3 (Fig. 3d) and de-energize such of the magnets 69MC and 70MP as were previously energized.

It may also be explained that upon LH reset, contacts 15 open to break the stick circuit for relay coil B and cause relay contacts B—I to open the circuit to the punch operating magnet and to cut off the circuits to the readout strip 73 of the punch.

In the foregoing description a complete operation has been traced for a single card in its various positions in passing through the machine. It may be mentioned, however, that after a card has been pre-sensed and the decimal point control set up that this card passes on through the card handling section of the mechanism and it is followed by a following card which is pre-sensed. It is accordingly necessary to have the pre-sensing control which was set up from a previous card in condition to receive a new pre-sensing control from a following card before all of the controls derived from the previous card are utilized. The overlapping energization and make-up of the various relays can be briefly referred to considering three cards in succession as passing through the machine from a starting up condition. The pre-sensing of the first card will energize relays 45MC and 45MP which will in turn bring about the energization of 46MC and 46MP. As the first card passes the regular reading brushes, relay coils 57MC and 58MP will be energized and after these relays become energized the 46MC and 47MP relays will be de-energized. The energization of 57MC and 58MP is then held during multiplying operations on card number I and it is during this time that 43MC and 45MP again become energized for the second card under the advance sensing which in turn re-energizes 46MC and 47MP. Relay coils 57MC and 58MP are retained energized for the first card until relay coils 69MC and 70MP become energized. These latter relays remain energized until punching of the summary products accumulation is complete. Relay coils 46MC and 47MP which become energized upon advance sensing of the second card remain energized until after 57MC and 58MP have become de-energized for the first card so that the maintained energization of 46MC and 47MP may effect a re-energization of 57MC and 58MP at the time the second card passes the reading brushes 28. Shortly after 57MC and 58MP have become energized for the second card their preceding control relays 46MC and 47MP are de-energized so that they can become re-energized upon the passage of the third card past the advance sensing brushes.

All of the foregoing will be clear from the timing diagram by considering the particular cams and reset contacts, etc., which control the sequence of energization and de-energization of the respective relays.

*Rate card operations*

Machines of this general class are also sometimes used on so-called rate card operations. With such operations the multiplier is taken from the first card of a group and it is retained in the machine for a number of succeeding computations and for following detail cards which bear the multiplicand data. When a new rate card comes along the old multiplier is cleared from the machine and a new multiplier entered from the following rate card, which new multiplier is used for the succeeding detail computations on following multiplicand or detail cards. When the machine is to be used for rate card operations it will be appreciated that the decimal setup or entry setup must be retained for the multiplier zone and not changed until a new rate card is read. When the old multiplier is cleared from the machine the setup of the relays 58MP (Fig. 3d) must be broken down to receive a new setup under the control of the following rate card. Under rate card operations each rate card has a so-called X punching in the first extra index point position in the card. This X punching is sensed by the X brush 23 (Figs. 2 and 3e). Such brush causes energization of the relay coil A. Relay coil A in addition to its usual contacts has supplemental relay contacts A—4 (Fig. 3e) which become closed on energization of relay coil A. With relay contacts A—4 closed a circuit is established from line 34 through cam contacts FC—15, through relay contacts A—4 to relay coil S. Energization of relay coil S causes closure of stick relay contacts S—I which maintain relay coil S energized through a circuit extending through the multiplier reset contacts 17. Referring now to Fig. 3d, energization of relay coil S shifts relay contacts S—2 previously mentioned to the reverse position from that shown. With relay contacts S—2 thus shifted the stick circuit for the 58MP coils is by-passed from extending through the MC reset contacts 20 and extends directly to the line 35. Accordingly, the setup of 58MP will not be broken down by reset of the MC accumulator, but this setup will be broken down only upon the reset of the MP accumulator when reset contacts 17 (see Fig. 3e) open. In connection with this rate card operation, while relay coils 58MP (Fig. 3d) control the selective energization of relay coils 70MP the de-energization of relay coils 70MP takes place independently of the maintained energization of 58MP. It will be understood therefore that while the 70MP relay coils de-energize once for every card handled they immediately become re-energized under the control of the relay coils 58MP which are maintained energized until a new rate card causes their de-energization and subsequent re-energization.

The foregoing operations for rate card control are also adaptable for the usual fixed multiplier operations which are operations where a large group of cards are preceded by a single card containing a multiplier factor.

What I claim is:

1. A record controlled accounting machine, including record controlled entry receiving means, record analyzing means for reading designations of amounts to be entered therein, shiftable connections between said entry receiving means and the analyzing means, presensing means for pre-sensing amount designations on the records to determine the denominational magnitude thereof and means controlled by said last named means for controlling the shiftable connections and effecting a columnar shift to vary denominationally the entries into the receiving means depending upon denominational magnitudes of amounts.

2. A multiplying machine controlled by factor amount representing means, devices controlled by the representing means for ascertaining the denominational magnitude of a factor amount with reference to a decimal point, factor receiving means under control of said amount representing means, multiplying means controlled by said receiving means having a result receiving means, recording means controlled by said result receiving means for recording products, shiftable connections for variably denominationally routing entries into the factor receiving means, means controlled by said ascertaining means for controlling said shiftable connections, a chain of hold over control devices including means initially conditioned by said ascertaining devices and supplemental retaining controls which retain a corresponding control set up condition during a multiplying operation, and shiftable connections intermediate the result receiving means and the recording means for variably denominationally transmitting results to the recording means, said connections being controlled by said last mentioned hold over control chain, whereby said ascertaining means controls both the routing of factor entries and the routing of products to the product recording means.

3. In a record controlled calculated machine comprising factor receiving devices, computing means controlled thereby, and result receiving means under control of said computing means wherein results of a computation are entered in a denominational position determined by the denominational position of factor entries into the receiving devices, result recording means controlled by said result receiving means; including in combination means for analyzing amount representations on records, shiftable entry routing devices between said analyzing means and said receiving devices, and shiftable routing means between the result receiving means and the result recording means, presensing means for determining the denominational magnitude characteristics of said amount representations, means controlled by said presensing means for shifting said entry routing devices to selectively vary the denominational relation of entry into the factor receiving devices thereby varying the denominational significance of entries, and a chain of hold over control devices including means initially conditioned by said presensing means and supplemental control means which retain a corresponding control set up condition during a computing operation for controlling the shiftable routing means between said result receiving means and said recording means, whereby said presensing means controls variable denominational routing of factor entries from the records and also controls denominational routing of results in recording to compensate for denominational shift in factor entry.

4. An accounting machine with means for analyzing amount representations on records, entry receiving means controlled by said analyzing means, computing means controlled by said entry receiving means and including result receiving means, further analyzing means for analyzing the amount representations on the records, means controlled thereby for determining the denominational magnitude of an amount to be entered with respect to the decimal point thereof, column shift means intermediate the first analyzing means and the entry receiving means for denominationally displacing entries of amounts into the receiving means, and means for selectively controlling said column shift means by the aforesaid denominational magnitude determining means.

5. The machine according to claim 4, wherein the column shift means comprises a plurality of switches and the denominational magnitude determining means controls said switches to cause an entry to be effected into the entry receiving means with the highest significant digit of an amount to the left of the decimal point thereof always entered in the highest order of the entry receiving means.

6. A machine according to claim 4 wherein plural entry receiving means are provided for receiving two factors of a computation and wherein a pair of magnitude determining means, a pair of column shift means and a pair of column shift control means are provided for controlling denominational shift of both factor entries.

7. A machine according to claim 4 including recording means controlled by the result receiving means and functioning upon completion of a computation, column shift means between the result receiving means and the recording means for enabling variable denominational routing of amounts from the result receiving means to the recording means and a chain of hold over control devices including means initially conditioned by the determining means and supplemental control means which retain a corresponding set up condition during a computing operation for selectively controlling said last mentioned column shift means.

8. A machine according to claim 4 having an amount receiving device adapted to receive a computed result from the result receiving means upon completion of a computation, further column shift means between said result receiving means and said amount receiving device, and a chain of hold over control devices including means initially conditioned by the determining means and supplemental control means which retain a corresponding set up condition during a computing operation for selectively controlling said further columns shift means.

9. In a record controlled calculating machine comprising factor receiving devices, computing means controlled thereby, and result receiving means under control of said computing means wherein results of a computation are entered in a denominational position determined by the denominational position of factor entries into the receiving devices, result recording means controlled by said result receiving means; including in combination, analyzing means for reading factor amounts on each record, sensing means for sensing amount representations on each record for detecting the denominational magnitude thereof, denominational magnitude determining control means controlled by the sensing means, column shift means intermediate the factor analyzing means and factor receiving devices enabling variable columnar entry thereinto, means for selectively controlling said column shift means from and by the magnitude determining means, a second column shift means intermediate the result receiving means and the recording means for enabling variable columnar routing of results to the recording means, and means for selectively controlling said second column shift means by and from the magnitude determining control means, said means including a train of interacting and interdependent control means which retain given control relations determined initially by the denominational determining means during each computing operation and until the corresponding recording operation, whereby said denominational magnitude determining and sensing means selectively control both the variable columnar entry shift and the variable columnar routing of results.

10. A machine according to claim 9 including two factor entry receiving devices, two denominational magnitude determining means for determining the denominational magnitude of each factor amount, and two column shift means one for each receiving device controlled by its respective determining means, and wherein the column shift means between the result receiving and the recording means is controlled conjointly by both of said denominational magnitude determining means.

11. In a calculating machine for effecting a calculation involving two terms, means for analyzing first and second term values on a record, means for sensing said record for detecting the denominational magnitude of the first and second term values, means comprising a plurality of sets of setup means controlled by said sensing means and set up in accordance with the determination of denominational magnitude, a denominationally ordered first term receiving means and a denominationally ordered second term receiving means, and a plurality of denominational shift means each controlled by the related one of said sets of setup means and constructed and arranged for directing entries effected under control of said analyzing means into said first and second term receiving means in orders thereof which are selected according to the denominational magnitude of the first and second term.

JAMES W. BRYCE.